US008683386B2

(12) United States Patent
Shuster

(10) Patent No.: US 8,683,386 B2
(45) Date of Patent: Mar. 25, 2014

(54) VIRTUAL ENVIRONMENT FOR COMPUTER GAME

(76) Inventor: Brian Mark Shuster, Vancouver (CA)

(*) Notice: Subject to any disclaimer, the term of this patent is extended or adjusted under 35 U.S.C. 154(b) by 1370 days.

(21) Appl. No.: 11/866,959

(22) Filed: Oct. 3, 2007

(65) Prior Publication Data

US 2008/0081701 A1    Apr. 3, 2008

Related U.S. Application Data

(60) Provisional application No. 60/827,930, filed on Oct. 3, 2006.

(51) Int. Cl.
*G06F 3/048* (2013.01)

(52) U.S. Cl.
USPC ........... 715/848; 715/706; 715/757; 715/849; 715/850; 715/851; 715/852; 463/30; 463/31; 463/32; 463/33; 463/34

(58) Field of Classification Search
USPC ......... 715/706, 757, 848, 849, 850, 851, 852; 463/30, 31, 32, 33, 34
See application file for complete search history.

(56) References Cited

U.S. PATENT DOCUMENTS

| 5,107,443 | A | * | 4/1992 | Smith et al. ................ 715/751 |
|---|---|---|---|---|
| 5,736,982 | A | * | 4/1998 | Suzuki et al. ............... 715/706 |
| 5,982,390 | A | * | 11/1999 | Stoneking et al. ........... 345/474 |
| 6,020,885 | A | * | 2/2000 | Honda ......................... 715/757 |
| 6,023,270 | A | * | 2/2000 | Brush et al. ................. 715/741 |
| 6,219,045 | B1 | | 4/2001 | Leahy et al. |
| 6,226,001 | B1 | * | 5/2001 | Bardon et al. ............... 345/419 |
| 6,381,444 | B1 | | 4/2002 | Aggarwal et al. |
| 6,767,287 | B1 | | 7/2004 | McQuaid et al. |
| 6,951,516 | B1 | * | 10/2005 | Eguchi et al. ................ 463/40 |
| 7,143,358 | B1 | * | 11/2006 | Yuen ............................ 715/757 |
| 7,210,104 | B2 | * | 4/2007 | Nakagawa et al. .......... 715/757 |
| 7,272,797 | B1 | * | 9/2007 | Kanevsky et al. ........... 715/748 |
| 7,326,117 | B1 | * | 2/2008 | Best ............................. 463/32 |
| 2001/0017671 | A1 | * | 8/2001 | Pleven et al. ................ 348/722 |
| 2001/0051989 | A1 | | 12/2001 | Moncreiff |
| 2002/0062348 | A1 | | 5/2002 | Maehiro |
| 2002/0097267 | A1 | * | 7/2002 | Dinan et al. ................. 345/757 |

(Continued)

FOREIGN PATENT DOCUMENTS

WO    WO 2008/109798    9/2008

OTHER PUBLICATIONS

U.S. Appl. No. 60/189,845, filed Mar. 16, 2000, Harron, et al.

*Primary Examiner* — Patrick Riegler
(74) *Attorney, Agent, or Firm* — Novak Druce Connolly Bove + Quigg LLP; Jonathan Jaech

(57) ABSTRACT

A multi-user virtual reality universe (VRU) process receives input from multiple remote clients to manipulate avatars through a modeled 3-D environment. A VRU host models movement of avatars in the VRU environment in response to client input, which each user providing input for control of a corresponding avatar. The modeled VRU data is provided by the host to client workstations for display of a simulated environment visible to all participants. The host maintains personalized data for selected modeled objects or areas that is personalized for specific users in response to client input. The host includes personalized data in modeling the VRU environment. The host may segregate VRU data provided to different clients participating in the same VRU environment according to limit personalized data to authorized users, while all users receive common data.

10 Claims, 6 Drawing Sheets

(56) References Cited

U.S. PATENT DOCUMENTS

| | | | |
|---|---|---|---|
| 2003/0014423 A1* | 1/2003 | Chuah et al. | 707/102 |
| 2003/0039945 A1 | 2/2003 | Dang et al. | |
| 2003/0051255 A1* | 3/2003 | Bulman et al. | 725/135 |
| 2003/0058238 A1* | 3/2003 | Doak et al. | 345/419 |
| 2003/0083922 A1 | 5/2003 | Reed | |
| 2003/0139938 A1 | 7/2003 | Meyers | |
| 2003/0151605 A1 | 8/2003 | Dominic | |
| 2004/0012640 A1* | 1/2004 | Gauthier | 345/848 |
| 2004/0015549 A1 | 1/2004 | Saruhashi et al. | |
| 2004/0024846 A1* | 2/2004 | Randall et al. | 709/219 |
| 2004/0030781 A1 | 2/2004 | Etesse et al. | |
| 2004/0235564 A1 | 11/2004 | Booth | |
| 2005/0005247 A1 | 1/2005 | Kamachi et al. | |
| 2005/0026692 A1 | 2/2005 | Dyl | |
| 2005/0034079 A1* | 2/2005 | Gunasekar et al. | 715/753 |
| 2005/0044005 A1 | 2/2005 | Giannini | |
| 2005/0128212 A1* | 6/2005 | Edecker et al. | 345/420 |
| 2006/0067573 A1* | 3/2006 | Parr et al. | 382/154 |
| 2006/0089873 A1 | 4/2006 | Stewart, Jr. et al. | |
| 2006/0119598 A1 | 6/2006 | Littlefield | |
| 2006/0287072 A1 | 12/2006 | Walker et al. | |
| 2006/0293103 A1 | 12/2006 | Mendelsohn | |
| 2007/0011273 A1 | 1/2007 | Greenstein | |
| 2007/0038559 A1 | 2/2007 | Jung et al. | |
| 2007/0061707 A1* | 3/2007 | Sally et al. | 715/513 |
| 2007/0124125 A1* | 5/2007 | Young et al. | 703/6 |
| 2007/0130339 A1 | 6/2007 | Alcorn et al. | |
| 2007/0162547 A1 | 7/2007 | Ross | |
| 2007/0202484 A1 | 8/2007 | Toombs et al. | |
| 2007/0220090 A1 | 9/2007 | Hall | |
| 2007/0224585 A1 | 9/2007 | Gerteis et al. | |
| 2007/0249323 A1 | 10/2007 | Lee et al. | |
| 2007/0255805 A1 | 11/2007 | Beams et al. | |
| 2007/0265091 A1* | 11/2007 | Aguilar et al. | 463/42 |
| 2008/0064018 A1 | 3/2008 | Griffin | |
| 2008/0081701 A1 | 4/2008 | Shuster | |
| 2008/0134056 A1 | 6/2008 | Shuster | |
| 2008/0158232 A1 | 7/2008 | Shuster | |

* cited by examiner

VIRTUAL ENVIRONMENT FOR COMPUTER GAME

CROSS-REFERENCE TO RELATED APPLICATION

This application claims priority pursuant to 35 U.S.C.§119 (e) to U.S. provisional application Ser. No. 60/827,930, filed Oct. 3, 2006, which application is specifically incorporated herein, in its entirety, by reference.

BACKGROUND OF THE INVENTION

1. Field of the Invention

The present invention relates to virtual environments such as used in computer gaming, and in particular for games that simulate an actual 3-D environment and allow for simultaneous participation of multiple players via remotely-located clients.

2. Description of Related Art

Various simulation games are known in which a 3-D physical world (actual or fantasy) is simulated. Games of this type are sometimes referred to as "virtual reality" or "virtual reality universe" (VRU) games. In known VRU games, an actual or fantasy universe is simulated within a computer memory. Multiple players may participate in a in the game through a computer network, such as a local area network or a wide area network. Each player selects an "avatar," often a three-dimensional figure of a man, woman, or other being, to represent them in the VRU environment. Players send inputs to a VRU engine to move their avatars around the VRU environment, and are able to cause interaction between their avatars and objects in the VRU. For example, a player's avatar may interact with an automated entity or person, simulated static objects, or avatars operated by other players.

The VRU may take the form of at least one area or environment which is a virtual-reality three-dimensional map existing in a computer memory of a host, consisting of elements that may include but are not limited to representations of rooms, outdoor areas, exotic environments, objects, people, animals, robots, avatars, robot avatars, time elements, additional spatial elements, and activities. Users establish a presence in the VRU by creating or using an avatar, which is a three-dimensional representative of the user in the VRU, and which can be navigated by the user around various environments in the VRU via a remote client. A view or views of the VRU are displayed to the user using a computer display and user interface software as known in the art. Each user provides input to a computer controlling the VRU using an input device connected to a local node or client, which is in turn connected to the networked computer system. The VRU is shared by all players and participants, using elements from the common memory.

The computer system is used to control the action of the avatars in response to user input. For example, avatars may be limited to simply observing the environment or area. That is, the client may not be permitted to influence any modeled object in the VRU environment by providing control input to the host for control of the client's avatar. But usually, avatars can interact with some or all of: other avatars, objects, the environment (e.g., walls, floors, roads, lakes, etc.), and automated or robotic avatars within at least one environment. In these cases, client control input may be permitted to cause changes in the modeled objects, such as moving other objects, opening doors, and so forth. It should be understood that "interaction" by an avatar with another modeled object in a VRU environment means that the game engine simulates an interaction in the modeled environment, in response to receiving client control input for the avatar. Interactions by one avatar with any other avatar, object, the environment or automated or robotic avatars may, in some cases, result in outcomes that may effect or otherwise be observed or experienced by other avatars, objects, the environment, and automated or robotic avatars within the at least one environment of the VRU.

One feature of the VRU is that it provides users with the ability to experience networked activities in a manner that is different from the current internet or the World Wide Web. Activities such as chat and shopping are distinguished from similar activities on the internet by the three-dimensional representations of other people, avatars, objects, etc. One drawback of the VRU is that, as in the actual world, the three-dimensional areas and environments are not customized to individual users.

As an example, in the current implementation of VRU's, a user's avatar may enter a virtual bookstore looking for a specific kind of book, say computer programming. The user may navigate his avatar into the store and observe other avatars and robotic sales-clerks. There may be an area filled with book-shelves that contain all manner of books on computers. This layout, which has been fixed by the store designer, may not be efficient for the user, as there may be too many related but unhelpful books for the user efficiently to find a useful book. Therefore, notwithstanding the advantages of existing VRU environments, it is desirable to provide new environments that overcome these and other limitations of the prior art.

SUMMARY OF THE INVENTION

The invention provides a system and method whereby individual users connected through clients to a VRU host may customize elements of a VRU environment operating on the host for their personal use, or for use by other players. A VRU is constructed comprised of common core elements, common non-core elements, and personalized elements. The core and non-core elements are the same for each user. Core elements represent areas of the VRU that are designed to be the same for all players, for example, certain public areas, particularly those in introductory parts of the game. Non-core elements are also common, but may be customized by users subject to defined conditions. Personalized elements are elements that have been defined or modified by individual players. Personalized elements can be divided into two types: private elements that are used only by the player that defined them, and public elements that can be used by other players.

Common elements are defined by a game administrator and placed in a common memory space. Robots, avatars, and other objects can move and be moved around and through the common space. A VRU engine updates the positions, textures, and other qualities of objects in the common space and in personalized spaces in response to user input. Each player is operatively connected to the VRU engine and VRU memory space via a player interface. All or portions of the player interface may reside at client terminals for the user or at a remote server. Among other things, the player interface receives VRU space information from the VRU engine and renders current information to a two-dimensional representation of the space as seen from a defined viewpoint, which is used to generate a display on a user display screen.

Non-core common elements are associated with a set of rules that define conditions under which the elements may be replaced or modified by elements or attributes that can be changed by a selected player or players. Among other things, these rules may define what conditions must be met before a player can modify the element, and what limitations are placed on the modification. For example, a rule may allow the texture of an element to be changed in a defined way, without modifying other attributes of the object, upon payment of a certain amount of virtual money. A VRU administrator module may be used to maintain these rules and determine when they are satisfied.

A non-core, common object in other respects may be handled in the same way as core objects, because the same rules are applied uniformly to all players. Once its attributes are modified, the non-core object behaves as any other core object, according the rules defined for it at the time. These rules may depend on the player or players that are interacting with the non-core object. For example, a non-core robotic pet may obey commands from a specified owner or owners, and not obey commands from other players. In addition, the attributes that can be modified may be changed any number of times. For example, the ownership of objects may change as the result of player-to-player transactions. A new owner may change attributes when first acquiring the non-core object, or at any time during a period of ownership.

Certain spaces and objects in the game may be defined as being personalizable. The qualities or behavior of a personalizable space depend on the identity of the avatar interacting with it. A personalizable space may replace an object or environment existing in a common space, or may exist as a separate environment or object. If the personalizable space comprises a separate environment, it may be accessed via a portal from a common space. The player or players with permission to enter the personalizable space may be distinguished using passwords, an invitation list, or other method. Uninvited users, or users that do not know the password, may be prevented from entering the personalizable space. In an embodiment of the invention, the portal to the personalizable space is not apparent to users, such that the space automatically appears to defined users, while other users see a common element such as a wall or other common environment in place of the personalized space.

Likewise, personalizable objects appear to one or more defined game players, but may be either invisible or unresponsive to other players. In the alternative, a personalizable object may behave like a species of non-core common object of a type that can only be changed by one or more defined players.

A more complete understanding of the virtual environment for a computer game will be afforded to those skilled in the art, as well as a realization of additional advantages and objects thereof, by a consideration of the following detailed description of the preferred embodiment. Reference will be made to the appended sheets of drawings, which will first be described briefly.

DETAILED DESCRIPTION OF THE PREFERRED EMBODIMENT

The disclosed solution to enhance VRU's is a system, apparatus and method for allowing users dynamically to create user-defined areas and environments.

Figure 1:
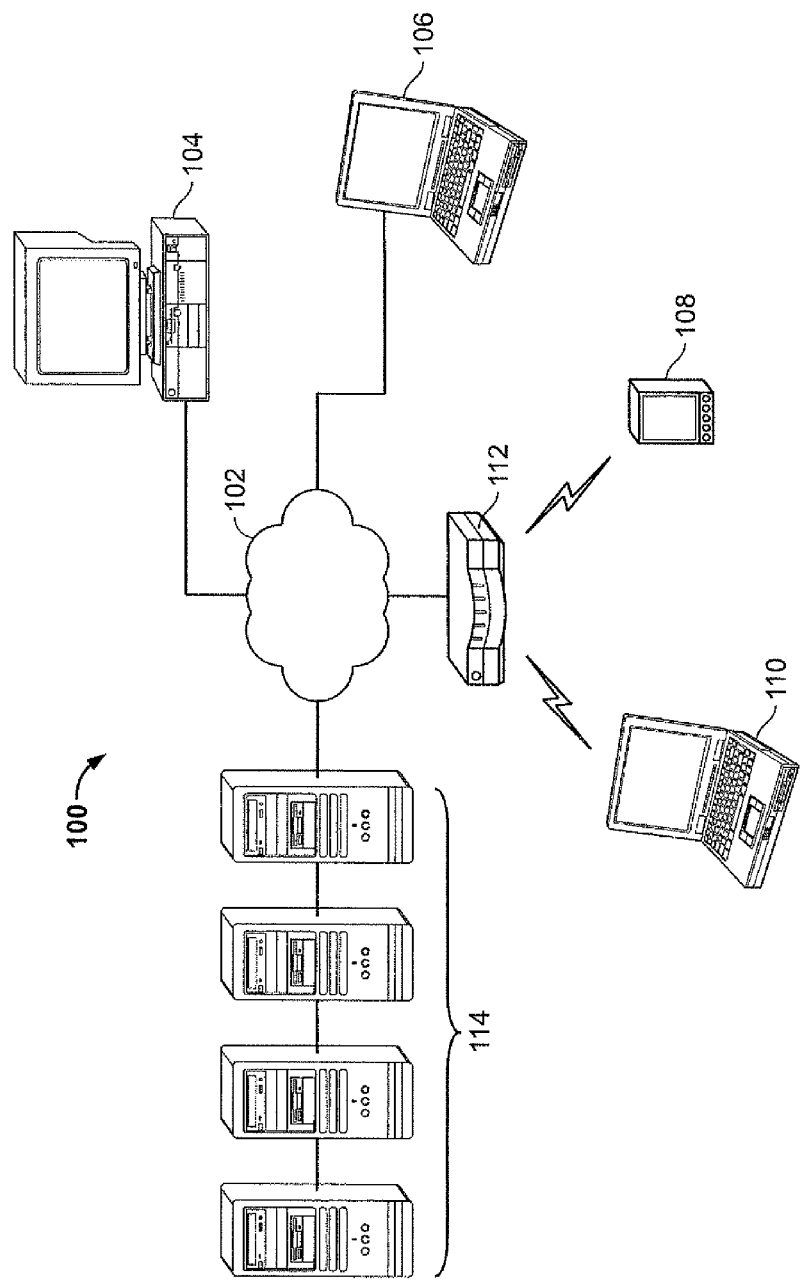
FIG. 1 is a schematic diagram showing a first system according to the invention.

Referring to FIG. 1, a system 100 for providing a VRU to multiple users may comprise a plurality of client sites, nodes or terminals, for example a personal computer 104, portable computers 106, 110, a compact player, cell phone or digital assistant 108, and/or router 112 communicating via a WAN 102 to one or more servers 114. Servers 114 store and serve game data and software to the client sites. Software or firmware may also be located at each client site, configured to work cooperatively with software or firmware operating on servers 114. Generally, any number of users may be communicating with servers 114 for game play at any given time via a corresponding number of the client sites.

Figure 2:
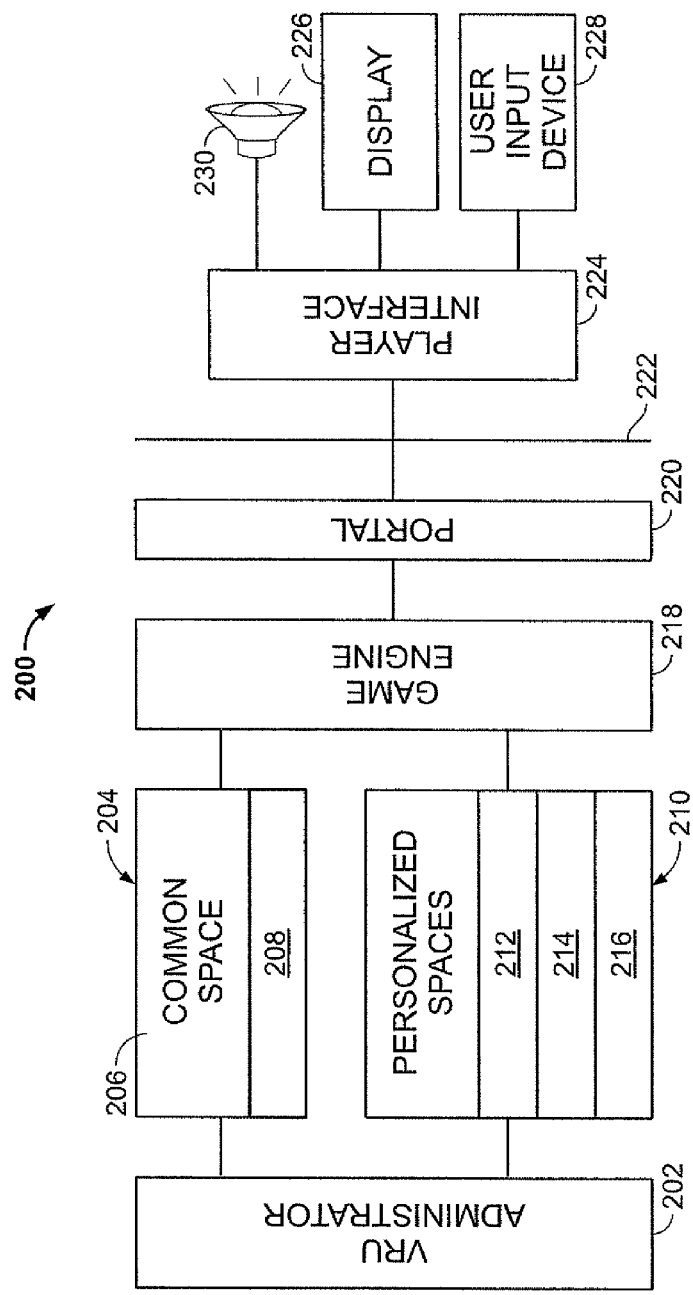
FIG. 2 is a schematic diagram showing a second system according to the invention.

Referring to FIG. 2, a system 200 for providing a VRU according to the invention may be considered to be comprised of server-side components (to the left of dashed line 222) and client-side components (to the right of dashed line 222). Server-side components may comprise a portal 220 for managing connections to multiple simultaneous players. Portal 220 interacts with a game engine 218, passing user input from multiple clients to a game engine, and passing game data from the game engine to respective individual players. Game engine 218 is operatively associated with two memory spaces, a common memory space 204 holding common elements of the VRU, and a personalized space 210. As known in the art, objects in a VRU are modeled as three-dimensional objects, or two-dimensional objects, having a defined location, orientation, surface, surface texture, and other properties for graphic rendering or game behavior. Common memory space 204 may be considered as comprised of a core area 206 for holding core common elements, and a non-core area 208 for holding non-core common elements 208. Personalized space 210 may be comprised of various different personal areas 212, 214, 216, each assigned to a different user.

A separate administration module 202 may operate at the server level to create, update, modify or otherwise control the content of the VRU as defined in the memory areas 204 and 210. Generally, changes in the personal space area 210 are driven by individual users, either through the VRU administrator 202 or another module. Control of common areas, i.e., the game environment and the objects in it, may be via the administrator module 202.

At the client level, a player interface module 224 may be installed to receive player inputs from one or more user input devices, such as a keyboard, mouse or other pointer, or microphone, and provide data to the game engine 218 via portal 222 in response to the input. The player interface module may also receive game data from portal 220 and process the data for display on display 226 and/or for audio output on speaker 230. Various systems and methods for providing a three-dimensional, multiplayer interactive animation to multiple players are known in the art, or may be adapted by one of ordinary skill for use with the invention. The invention is not limited to a particular hardware or software architecture for carrying out the steps described herein. Operational aspects of the exemplary server/client system are described below.

In an embodiment of the invention, a user defines an area or environment to be created for them through a method including but not limited to: responding to questions in a form served by the host, filling out a form served by the host, making a specific request via any mechanism, especially electronic messaging, making a request via a form or robot avatar, making a specific request to a live person or salesperson, clicking on one or more results from a search, creating a user-profile, having a user profile created from their past behavior, having a user profile created from their prior searches, having a user profile created based on their prior responses to questions or forms, or generally making a specific request via any mechanism. Based on the information supplied by or deduced about the user, the VRU server establishes a customized environment or area that comports to the specific request or interest of the user. This customized environment or area may be unique for the user, or it may be one of numerous already-created environments or areas that best suit the user's preference, or it may be a dynamically created environment or area that is neither already-created nor unique for the user.

The environments or areas that are created or presented in this manner by the host to the user could be presented in such a way that the user is alone in the simulated environment or area. In the alternative, or in addition, the simulated area or environment may support some or all of the multi-user features of the VRU, with the distinction that client enables the user to perceive certain features of the environment or area such as but not limited to: rooms, outdoor areas, exotic environments, objects, people, animals, robots, avatars, robot avatars, time elements, additional spatial elements, and activities that other users may not be able to perceive, or which other users may perceive differently based on their own user-defined environment or area. Such users may, optionally, still be able to interact with or perceive one another while simply experiencing different elements as described above.

Even if users are in different of the dynamically created environments or areas, they may optionally be able to share elements of those environments or areas with one-another. Thus for example, if users are in a VRU that utilizes an embodiment wherein users that are in different dynamically created environments are permitted to perceive and interact with one-another, those users may optionally be able to "turn-on" or otherwise share elements of the environment or area that they are experiencing with users from alternate dynamic environments or areas, by sending a command to the VRU host. In response to the command, the VRU host may serve objects personalized for the requesting user to other connected clients.

The host may be configured such that users are able to create a user-defined environment or area and allow access to that specific area to other users, either by opening the environment or area to entry by other users or by inviting other users into the environment or area or by any other established means for permitting (generally or on a restricted basis) other users into that environment or area. Such an environment or area could, optionally, terminate at the discretion of the user who created that environment or area, or could remain persistent for any useful duration based on other users, system preference or other reason or purpose. The useful duration could, in fact, be permanent.

Returning now to the example of the user who is shopping for a computer programming book in a VRU, environment, suppose it is desired to enable greater success in finding books on subjects of interest in a VRU bookstore. Depending on the embodiment that is in use, the user may select that he wishes to find a book specifically on a subject matter defined by the user, for example, on computer programming. In response, the VRU host may model an entire bookstore that displaying modeled representations of books each of which, when selected by the user, direct the user towards an online book or purchase of a book in the defined subject area of computer programming. Alternatively, an area of the existing bookstore may be transformed by the host from an empty area or from some other purpose, into an area—say a bookshelf, that include only modeled representation of books linking to works on the subject of computer programming.

Continuing this example, the VRU host may dynamically model user-defined environments or areas, such that upon entry of the user's avatar into the VRU bookstore, the host may provide to the user's client machine information for modeling a standard bookstore environment with a modeled area, such as a modeled alcove or a bookshelf, including a customized selection of modeled books that the software of the proprietor of the bookstore has determined would be of particular interest to the user. Each modeled book may comprise an interactive modeled three-dimensional object, configured to link to an actual bookseller or provider of the book or other publication indicated by a title or other description appearing on the modeled book. Thus, personalized or customized areas or environments may be presented to a user based on a determination by the host of the environment or area that the user is accessing.

The host may determine how and what to customize in their environment or area so as to best suit the purposes of the operator and/or the user using a variety of input data, including but not limited to user responses to questions, user submitted information, user's history (such as user's past: buying behavior, shopping behavior, movements within the environment or other environments, information supplied and other historical information), user's profile information, user's address or location, as well as aggregated information about similar users and their behavior and relative behavior, and any other information about the user or generally about users that would be useful to the operator in determining the appropriate customizations to present to the user.

In an embodiment of the invention, a VRU memory space 212 is defined that is associated with a user ID in a memory of a host. The VRU memory space is used to hold elements of a VRU space that are personalized for the user. In the alternative, the space may hold an entire personalized VRU. When a user logs on via a remote client, the host computer system accesses the personalized VRU memory to generate VRU information for serving to the client, and may also access a general or public VRU memory 204 of the host. Public memory 204 may include elements of the VRU that are public or available to other users. The user's experience of the VRU may be generated by combining elements of the personalized VRU and the public VRU in any desired manner, according to the set of predefined rules. For example, the elements from the personalized VRU 212 may be added to a public VRU 206, 208 to create a customized VRU environment. In the alternative, personalized VRU elements may be used to modify or replace elements in the public space 206, 208.

A set of rules may be used at the host to prioritize and coordinate elements between public and personalized VRU spaces having competing elements. Objects or regions of virtual space may be defined with certain priority values. When elements of a space are generated by combining elements from more than one VRU memory space, conflicting instructions for the same object or region of space may be resolved by comparing the priority values. The object or region of space with the highest priority may be used in generating the user experience. The assignment of priorities may be predetermined, or may vary according to rules of game play or other user input. For example, in a VRU space generated by combining VRU memories from different users, the properties of an object or region of space may be determined from the personal space of the user having the highest game score. It should be apparent that various other ways of using two or more VRU memory spaces to generate a user experience, or separate user experiences, are possible. Further, any number of spaces may be combined, with or without competing elements.

In an embodiment of the invention, therefore, a 3-D space and objects therein are defined in a computer memory of a VRU host, configured for generating an experience of the space through a user interface to a plurality of interconnected users over a computer network. A set of generating rules are also defined in the computer memory, operable to generate the user experience using the 3-D space. At least one object or region of the 3-D space is customizable based on user input. The object or region of space is interactive with an avatar or other representation of the user, and may be shared with the plurality of interconnected users.

Figure 3:
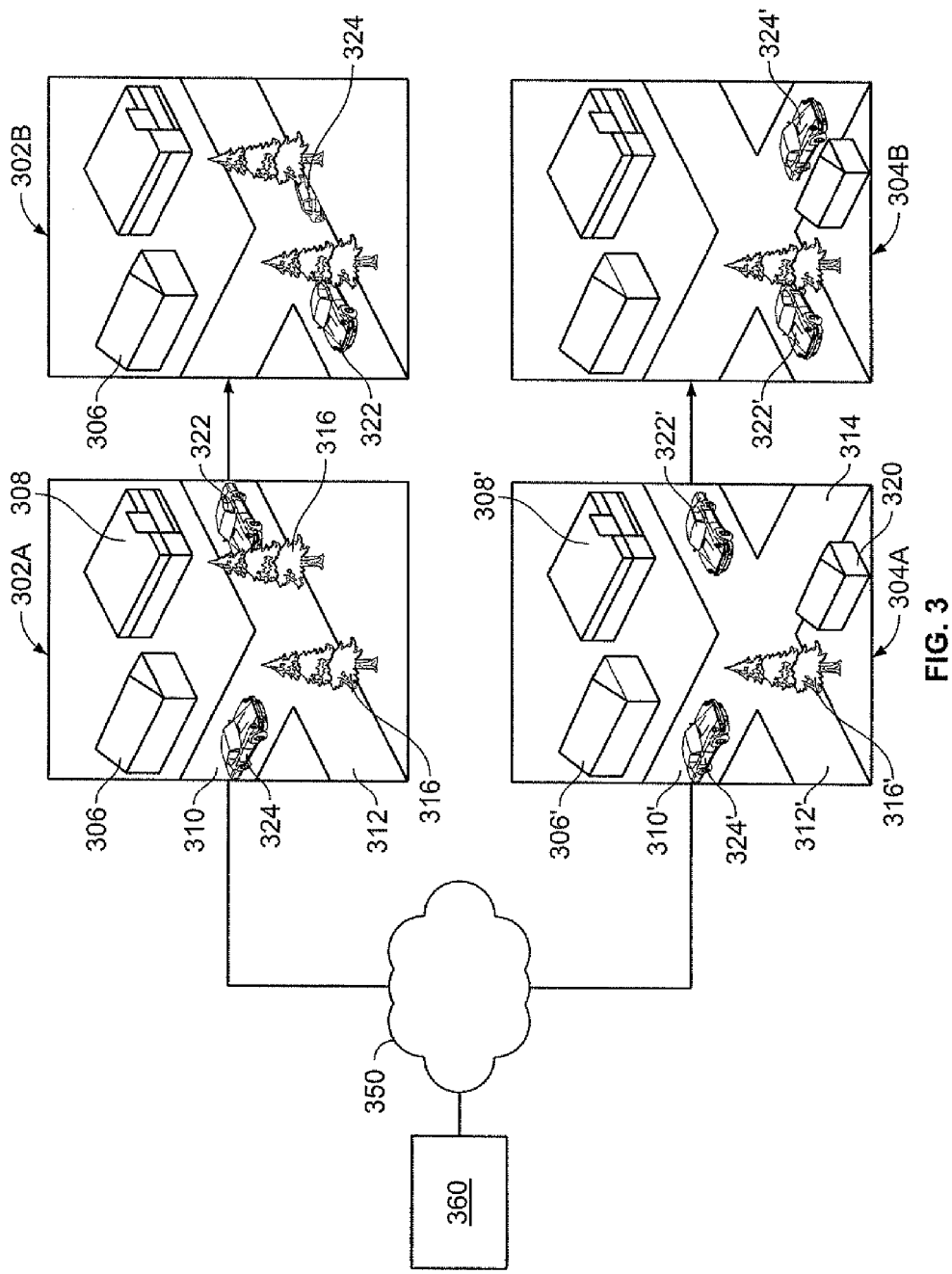
FIG. 3 is a diagram showing exemplary views of a VRU at different times.

FIG. 3 shows a first display 302A-B and a second display 304A-B connected to a VRU server 360 via a WAN 350. Displays 302A-B represent exemplary views of a VRU space displayed on a first client at two respective times "A" and "B." Likewise, displays 304A-B represent exemplary views of the VRU space displayed on a second client at the two times. Certain common elements are visible in all displays, such as house 306, 306', store 308, 308', roads 310, 312, 310', 312', and tree 316, 316'. Cars 322, 322', 324, 324' represent personal objects such as avatars or other personal objects each under the control of a participant. Car 322, 322' is under the control of a first player, who sees the displays 302A-B on the first client. Car 324, 324' is under the control of a second player who sees the displays 304A-B on the second client. Both cars 322, 324 are visible to both players, and may interact in defined ways.

The second player has access to a personalized space and objects that appear in display 304A-B but not in display 302A-B, namely, road 314 and shed 320. In the alternative, the road 314 and/or shed 320 may appear to the first player, but not be usable or responsive to the first player. Personalizable elements may be won, purchased, or otherwise assigned to a player. A common element 318 appears only in display 318 for the first player, because the second player has defined an object (road 314) that competes for space that would otherwise be occupied by the tree 318. Therefore, in an embodiment of the invention, the conflict between the common element 318 and road 314 is detected and resolved according to a defined priority. In the illustrated case, the common tree 318 appearing in 302A-B is subtracted or omitted from 304A-B before rendering the scene.

At time "A," both players are located in or on common space and common objects, so both players are visible to each other and themselves. At time "B," the second car 324 has entered a personal space, traveling on personal road 314. Hence, car 324 may be caused to disappear, either partially or entirely, from display 302B. In the alternative, car 324 may be "parked" at a location in the common space, "grayed out" or otherwise flagged to indicate that the second player is no longer in the common space. Yet another alternative is to render both scenes in the same way, but to prevent or restrict the interaction that the first player can have with the second player's personalizable objects. Meanwhile, the car 324' is visible on display 304B along with the personalizable road 314 and shed 320.

In the illustrated example, it should be emphasizes that car 324 does not merely move from view of the first player; rather, it can, at the option of the game designer, be removed entirely from a three-dimensional scene provided to the first player's client device. Thus, the personal object belonging to the second player can be entirely removed from the first player's scene, so that it exists only for the second player but not for the first. In addition, the second player may invite the first player or any other player to join him in the personal space, for any desired period of time.

An interface or portal should be provided between each respective personal space and the common space. The portal may be visible and apparent to all players, or may be blended with objects in the common scene so that it is not apparent. It should also be appreciated that a single portal, whether apparent or not, may lead to different personal spaces belonging to different players. For example, a storefront may in effect be a portal to a personal space, so that each player that directs an avatar to enter the store sees a customized array of products. Such multiple-use portals may lead to environments that contain a mixture of personal and common spaces and objects. For example, the store aisles may be common space, while the store shelves are personal spaces filled with personalizable objects. Thus, for example, multiple clients may receive the same scene of avatars browsing the aisles, without being provided with views of the products provided only to the individual players.

Figure 4:
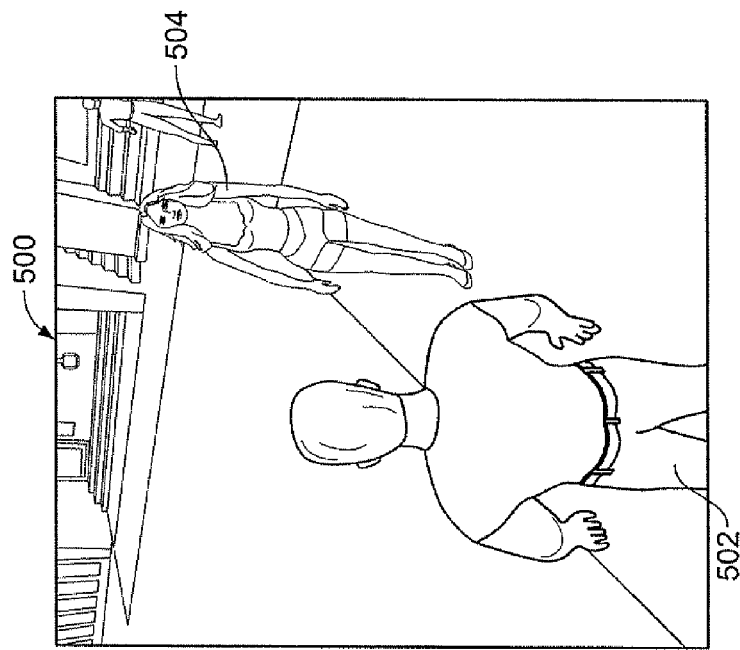
FIG. 4 is an exemplary view of a VRU with avatars.

FIG. 4 shows an exemplary common scene 400 containing multiple avatars, e.g., avatars 402, 404. Each avatar is controlled by a different player via a remote interface. The common scene 400 appears to be the same for each avatar. However, each player may select a different viewpoint of the scene, so the rendered view of the scene may be different for different players. Scene 400 includes multiple storefronts, such as storefront 406, that may serve as portals to common spaces, personalizable spaces, or some combination of the foregoing.

Figure 5:
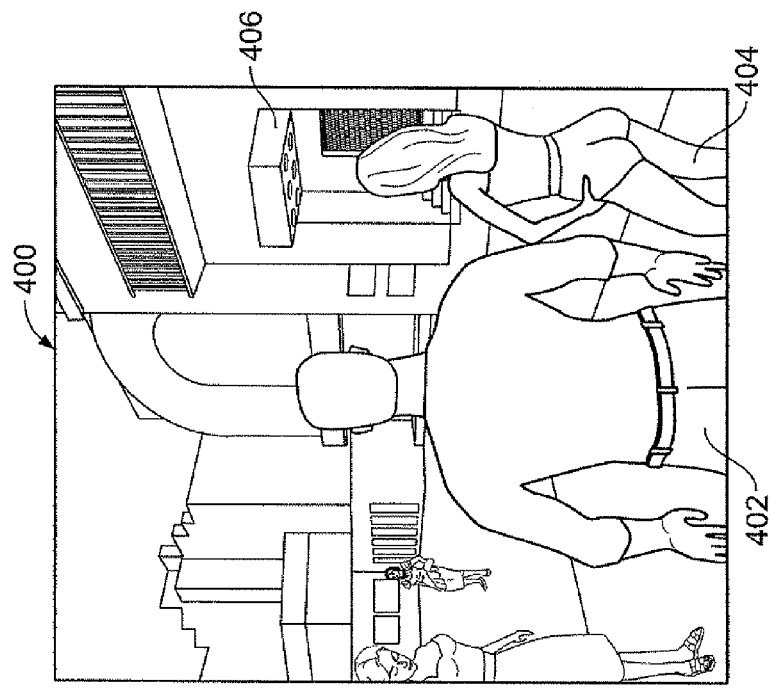
FIG. 5 is an exemplary second view of a VRU with avatars.

FIG. 5 shows another exemplary common scene 500 including a first avatar 502 positioned for interaction with a second avatar 504. Interaction may include, for example, audio chatting, text chatting, and simulated physical interaction. In general, avatars behave as non-core common elements, in that each avatar has a customizable appearance that can be defined or modified by individual players, but is otherwise an object that is visible in the common areas and interacts with other players according to predefined rules.

Figure 6B:
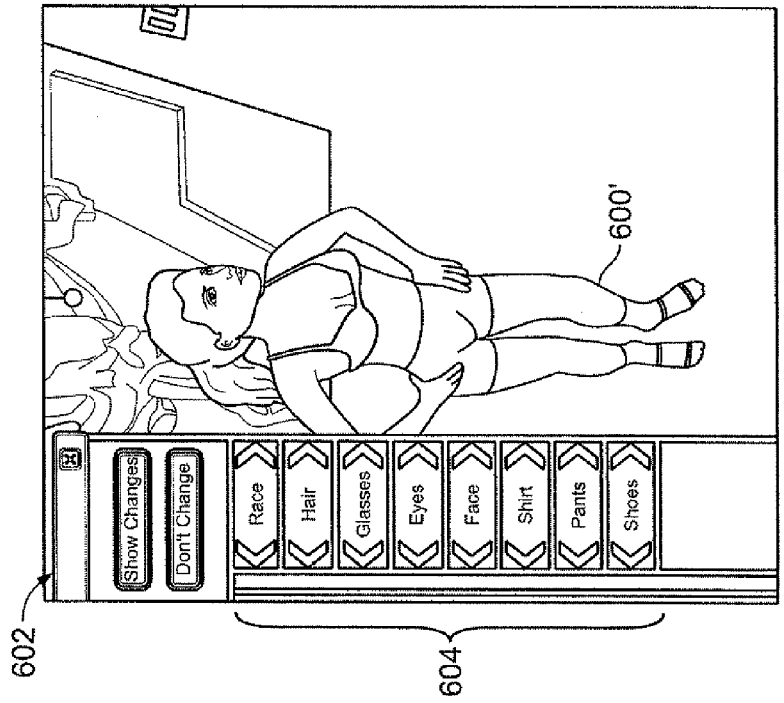
FIG. 6B is an exemplary second view of an avatar with a customization menu.
Figure 6A:
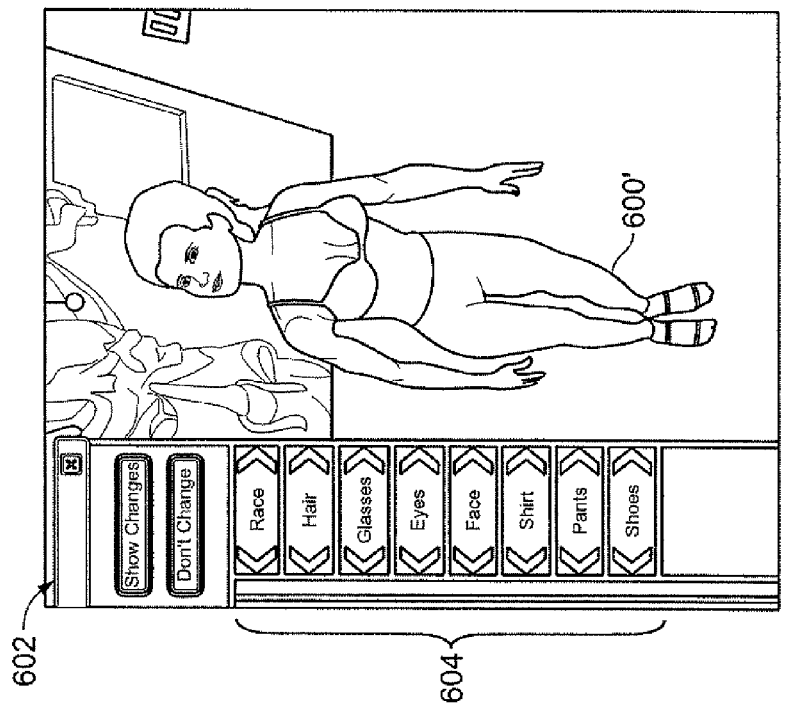
FIG. 6A is an exemplary view of an avatar with a customization menu.

FIGS. 6A and 6B show an avatar 600, 600' visible with a customization menu 602. Menu 602 may be requested by the player controlling the avatar when initially configuring the avatar, or at later times, for example, when a change of clothes is desired. Menu 602 may include a list of options 604 for customizable elements of the avatar. In the illustrated embodiment, the customization menu includes options to change the avatar's racial characteristics, hat, glasses, facial features, shirt, pants and shoes. In FIG. 6A, the avatar 600 is wearing a white top and black pants. In FIG. 6B, the avatar is dressed in a red top and yellow shorts. Clothing, skin tone, and other features of an avatar may be provided via a customizable texture applied to a three-dimensional model. Optionally, a fee may be charged for certain changes, such as clothing or accessories.

Figure 7:
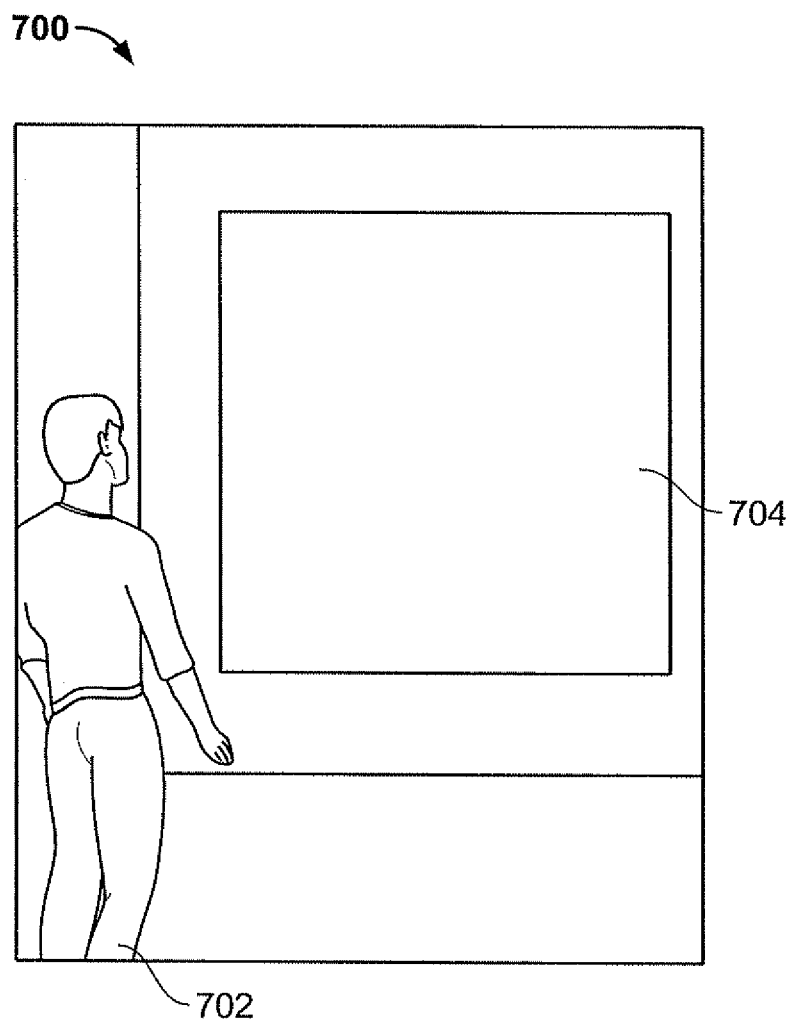
FIG. 7 is an exemplary view of an avatar adjacent to a personalizable object.

FIG. 7 shows a scene 700 including an avatar 702 gazing at a personalizable screen 704. Screen 704 may exist as a black or blank screen in the common space. A player operating the avatar 702 may activate the screen to play a video or provide other requested content. Other users would see a blank screen or could request their own content for display on the screen. Optionally, a fee may be required for display of user-selected content. In the alternative, the screen may be used to display free common content visible to multiple players, for example, advertising.

The systems described according to the foregoing may be used to perform an exemplary method for personalizing modeled objects in a multi-user VRU environment, as follows. Exemplary steps of the method may be performed by a host computer in response to client input data. The steps may include modeling, in a memory of a host computer, a modeled three-dimensional space including modeled avatars each controlled in response to avatar control input from corresponding ones of a plurality of separate remote clients.

The host computer may further maintain personalized modeled objects and common modeled objects as distinct object types in the computer memory associated with the modeled three-dimensional space. The host may set attributes of the personalized modeled objects in response to personalization data associated with ones of the plurality of separate remote clients. Attributes of a modeled object are those pieces of information that control the appearance or behavior of the modeled object in the modeled environment. The host does not use data associated with ones of the plurality of separate remote clients to set attributes of the common modeled objects. Common modeled objects may therefore be distinguished on this basis from personalized modeled objects.

The host may receive the personalization data associated with ones of the plurality of separate remote clients as active input from the plurality of separate remote clients. Personalization data may include data provided actively by the clients, such as in response to a request, by filling out a form, or other active interaction to specify a client interest. Personalization data may also be gathered passively, such as by inferring client interests from a record of network browsing activity.

The host may further transmit environmental modeling information to the plurality of separate remote clients configured for displaying an animated view of the modeled three-dimensional space including the modeled avatars, the personalized modeled objects and the common modeled objects. Environmental modeling information is coded information configured for use by client nodes to generate a view of the multi-user environment, including both common and personalized modeled objects. This may be in the form of low-level graphic data or any desired higher level data, including high level modeling information. For more efficient use of bandwidth, clients may store or cache environmental information locally. The host may then generate a data stream reflecting any changes that occur in the modeled environment.

According to an aspect of the described technology, the environmental modeling information before transmitting it to the plurality of separate remote clients so that each of the plurality of separate remote clients receives different information. The host may personalize the environmental modeling information so that respective ones of the plurality of separate remote clients do not receive information for displaying personalized modeled objects that have attributes set in response to personalization data from other users, while all of the plurality of separate remote clients receive information for displaying the common modeled objects and such of the personalized modeled objects that have attributes set in response to personalization data associated with the respective ones of the plurality of separate remote clients. Each client would then receive information about common features as necessary to generate shared environments at the client level, and in addition, unique personalized data that is used only by the client receiving it. In the alternative, or in addition, the same personalized data may be provided to multiple clients.

When clients receiving data for modeling a common area of the environment do not receive the same information, the host may transmit information for display of common modeled objects selected to substitute for personalized modeled objects not transmitted to the respective ones of the plurality of separate remote clients. For example, if client 'A' is served personalized data for a modeled bookshelf with books, client 'B' may receive default, common data for display in the same location of the environment as the personalized bookshelf of client 'A'.

Some users may wish to restrict access to data personalized for them, such as restricting access to other users selected or authorized by the user to who the personalized data pertains. Therefore, the host may restrict access to information for displaying personalized modeled objects to a first one of the plurality of separate remote clients and to others of the plurality of separate remote clients such as are identified to the host by an authorized user of the first one of the plurality of separate remote clients. Access may be restricted by not providing the personalized modeled objects except to authorized clients, by providing the personalized modeled objects encrypted or otherwise locked except to clients possessing a requisite key, or by any other suitable method. Authorization status may be determined via a lookup table populated by client ID's, by requiring a password, or any other suitable method.

The host may further receive attributes of the personalized modeled objects as data from respective ones of the plurality of separate remote clients. For example, a user may define attributes of a personal space by selecting options from an options menu served by the host to the client. For further example, users may utilize their respective client nodes to upload attribute data, such as personalized textures, modeled accessories, or the like, to a host server.

The systems described herein may further be used to perform an exemplary multi-user animation method, as follows. A host managing a modeled 3-D environment may receive input from multiple remote clients to manipulate corresponding modeled objects in the environment, such as via a wide area network connection. The host may further process data received from the multiple remote clients to set attributes of ones of the modeled objects determined by corresponding ones of the multiple remote clients. For example, attributes may be set by user selections form a preferences of interest menu. The host may receive input from the multiple remote clients at the host, and define attributes of the ones of the modeled objects using the input. The host may maintain a correspondence between each of the multiple remote clients and corresponding ones of the modeled objects such that each modeled object moves in response to input from a corresponding one of the multiple remote clients, thereby maintaining a model of a multi-user environment. Furthermore, the host may maintain a database containing attributes of ones of the modeled objects determined by corresponding ones of the multiple remote clients for use in generating the time-delimited 3-D environment data.

The host then distributes real-time or near-real time data concerning present status of the multi-user environment to the multiple remote clients. For example, the host may provide time-delimited 3-D environment data for the modeled objects to the multiple remote clients formatted to facilitate display of a simulated environment visible to the multiple remote clients. The environmental data may be configured by the host such that each of the multiple remote clients cannot display ones of the modeled objects, unless authorized by corresponding ones of the multiple remote clients that have determined the attributes of the ones of the modeled objects. Personalized data may thus be provided only to authorized clients.

The host may further receive information from first ones of the multiple remote clients identifying other ones of the multiple remote clients to be authorized to display the ones of the modeled objects that have attributes determined by the first ones of the multiple remote clients. A first user may thereby be enabled to identify one or more other users authorized to receive data concerning personalized modeled objects corresponding to the first user. The host may also provide the time-delimited 3-D environment data for the modeled objects to the multiple remote clients further configured to cause ones of the multiple remote clients not authorized to display one of the modeled objects to display in place of it a replacement of the modeled objects. The host may further set attributes of the replacement one of the modeled objects without using the data received from the multiple remote clients. The replacement modeled object may thereby be a common modeled object for providing to multiple clients.

The systems described herein may further be used to perform an exemplary method for managing an interactive multiplayer computer game system to provide each player with an option to personally determine elements that appear in the game environment, as follows. A host may maintain a database of electronic content for a game environment having personalized content items each associated with identifying information for game participants and common content items not associated with identifying information for game participants. The host further hosts a game process in which remote game participants provide input via remote clients to a host for manipulation of modeled avatar objects in a multi-user game including the electronic content. The host may also perform a step of serving output from the game process to the remote clients to cause displays of a game environment the remote clients.

The host may configure the output to cause simultaneous display of common content items and personalized content items within a game scene viewed in common by the game participants, so that a first client displays a first common content item, first and second avatars, and a first personalized content item, and does not display a second personalized content item. Meanwhile, the output is further configured so that a second client displays the first common content item, first and second avatars, and the second personalized content item, and does not display the first personalized content item. Thus, the output data may be configured so that different game participants are enabled to interact each other in game environments that include personalized elements visible only to selected ones of the game participants.

The host may further provide the output configured to cause the first client to display a second common content item in place of the second personalized content item.

The host may further track identities of game participants authorized by a first game participant to receive game output data for displaying a personalized content item associated with identifying information for the first game participant.

The host may output the data configured such that the personalized content items include items selected as relating to a topic of interest associated with game participants. For example, the personalized content items may include items providing a link to a product for sale for display in a simulated shopping environment.

Software instructions for performing any of the methods described herein may be encoded in a computer-readable memory, according to methods known in the art. In general, configuring a host to perform the functions described herein should be within the ability of one of ordinary skill in the programming art, having possession of the instant description.

Having thus described embodiments of a virtual environment for a computer game, it should be apparent to those skilled in the art that certain advantages of the within system have been achieved. It should also be appreciated that various modifications, adaptations, and alternative embodiments thereof may be made without departing from the scope and spirit of the present description. For example, a system operable over a wide area network has been illustrated, but it should be apparent that the inventive concepts described above would be equally applicable to systems operating over other networks.

What is claimed is:

1. A method for personalizing modeled objects in a multi-user VRU environment, comprising:
    modeling, in a memory of a host computer, a modeled three-dimensional space including modeled avatars each controlled in response to avatar control input from corresponding ones of a plurality of separate remote clients;
    maintaining personalized modeled objects and common modeled objects as distinct three-dimensional object types in the computer memory in the modeled three-dimensional space, wherein the host sets attributes of respective ones of the personalized modeled objects based on different personalization data associated with corresponding respective ones of the plurality of separate remote clients while setting attributes of the common modeled objects without reference to the personalization data, and wherein the attributes comprise information that controls textures for the personalized modeled objects; and
    transmitting environmental modeling information to the plurality of separate remote clients configured for displaying an animated view of the modeled three-dimensional space including the modeled avatars, the common modeled objects, and different ones of the personalized modeled objects depending on respective identities of the plurality of separate remote clients.

2. The method of claim 1, further comprising personalizing the environmental modeling information before transmitting it to the plurality of separate remote clients and providing different information from the personalizing to each of the plurality of separate remote clients.

3. The method of claim 2, wherein personalizing the environmental modeling information further comprises preventing some respective ones of the plurality of separate remote clients from receiving first information for displaying personalized modeled objects that have one or more of the attributes set in response to personalization data from other users, while providing all of the plurality of separate remote clients with second information for displaying the common modeled objects.

4. The method of claim 3, further comprising transmitting information for display of one or more of the common modeled objects from a common memory space selected to substitute in the modeled three-dimensional space for one or more of the personalized modeled objects that are not transmitted to the respective ones of the plurality of separate remote clients.

5. The method of claim 1, further comprising restricting access to information for displaying one or more of the personalized modeled objects to a first one of the plurality of separate remote clients and to others of the plurality of separate remote clients such as are identified to the host by an authorized user of the first one of the plurality of separate remote clients, by personalizing the environmental modeling information and preventing unauthorized ones of the remote client from accessing the one or more of the personalized modeled objects.

6. The method of claim 1, further comprising receiving the personalization data associated with ones of the plurality of separate remote clients as active input from the plurality of separate remote clients.

7. The method of claim 1, further comprising receiving the attributes of the personalized modeled objects as data from respective ones of the plurality of separate remote clients.

8. A computer-readable memory encoded with instructions for managing an interactive multiplayer computer game system to provide each player with an option to personally determine elements that appear in the game environment, the instructions configured for:

modeling, in a memory of a host computer, a modeled three-dimensional space including modeled avatars each controlled in response to avatar control input from corresponding ones of a plurality of separate remote clients;

maintaining personalized modeled objects and common modeled objects as distinct three-dimensional object types in the computer memory in the modeled three-dimensional space, wherein the host sets attributes of respective ones of the personalized modeled objects based on different personalization data associated with corresponding respective ones of the plurality of separate remote clients while setting attributes of the common modeled objects without reference to the personalization data, and wherein the attributes comprise information that controls textures for the personalized modeled objects; and transmitting environmental modeling information to the plurality of separate remote clients configured for displaying an animated view of the modeled three-dimensional space including the modeled avatars, the common modeled objects, and different ones of the personalized modeled objects depending on respective identities of the plurality of separate remote clients.

9. The memory of claim 8, the instructions further configured for personalizing the environmental modeling information before transmitting it to the plurality of separate remote clients and providing different information from the personalizing to each of the plurality of separate remote clients.

10. The memory of claim 9, the instructions further configured for restricting access to information for displaying one or more of the personalized modeled objects to a first one of the plurality of separate remote clients and to others of the plurality of separate remote clients such as are identified to the host by an authorized user of the first one of the plurality of separate remote clients, by personalizing the environmental modeling information and preventing unauthorized ones of the remote client from accessing the one or more of the personalized modeled objects.

* * * * *